United States Patent
Dunbar et al.

(10) Patent No.: US 11,668,387 B1
(45) Date of Patent: Jun. 6, 2023

(54) DAMPER PULLEY DESIGN

(71) Applicant: Caterpillar Inc., Peoria, IL (US)

(72) Inventors: James Dunbar, East Peoria, IL (US); Lee David Kress, Lafayette, IN (US); Dongyao Wang, Rochester Hills, MI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/839,328

(22) Filed: Jun. 13, 2022

(51) Int. Cl.
  *F16H 55/36* (2006.01)
  *F16H 57/04* (2010.01)
  *B60K 25/02* (2006.01)

(52) U.S. Cl.
  CPC ............. *F16H 55/36* (2013.01); *B60K 25/02* (2013.01); *F16H 57/0416* (2013.01); *B60K 2025/022* (2013.01); *F16H 2055/366* (2013.01)

(58) Field of Classification Search
  CPC ................. F16H 55/36; F16H 57/0416; F16H 2055/366; B60K 25/02; B60K 2025/022
  See application file for complete search history.

(56) References Cited

U.S. PATENT DOCUMENTS

| | | | | |
|---|---|---|---|---|
| 2004/0082390 A1* | 4/2004 | Nosaka | ..................... | F16D 9/06 464/32 |
| 2004/0176200 A1* | 9/2004 | Nosaka | ..................... | F16D 1/06 474/166 |
| 2015/0252885 A1* | 9/2015 | Manzoor | ............... | F16F 15/126 474/166 |
| 2016/0102730 A1* | 4/2016 | Manzoor | ............... | F16F 15/126 464/99 |
| 2018/0162213 A1* | 6/2018 | Colavincenzo | ......... | B60L 50/15 |
| 2019/0383323 A1 | 12/2019 | Thompson et al. | | |
| 2020/0086849 A1* | 3/2020 | Colavincenzo | ........ | B60K 25/02 |

FOREIGN PATENT DOCUMENTS

| | | | | |
|---|---|---|---|---|
| CN | 213598536 U | 7/2021 | | |
| DE | 3929019 A1 | 3/1991 | | |
| JP | 2567250 U | 12/1996 | | |
| KR | 100792906 B1 | 1/2008 | | |
| KR | 1035198 B1 * | 5/2011 | ............. | F16H 55/36 |
| KR | 101936612 B1 | 1/2019 | | |

* cited by examiner

*Primary Examiner* — Joseph J Dallo
(74) *Attorney, Agent, or Firm* — Procopio, Cory, Hargreaves & Savitch LLP

(57) ABSTRACT

A damper and pulley assembly for an internal combustion engine is disclosed. The damper and pulley assembly, including a pulley closely fitted between two dampers, is configured to have increased air movement for heat dissipation while conforming to low spacing requirements of an engine compartment. The pulley can have multiple slots along its two side surfaces and openings located in the slots. The slots and openings of the pulley are aligned with openings of the two dampers, and facilitate air movement through the pulley and around the dampers.

20 Claims, 6 Drawing Sheets

DAMPER PULLEY DESIGN

GOVERNMENT SUPPORT CLAUSE

This invention was made with government support under Other Transaction (OT) Authority Agreement No. OTA-W56HZV-16-9-0001 awarded by the United States Army. The government has certain rights in the invention.

TECHNICAL FIELD

The embodiments described herein are generally directed to engine damper and pulley assemblies, and, more particularly, to damper and pulley assembly design having increased air flow for improved heat dissipation.

BACKGROUND OF THE INVENTION

The front part of a crankshaft of an internal combustion engine may be connected to a pulley (e.g., for driving the alternator) and damper(s) to counter the torsional/harmonic vibrations of the engine. Dampers, due to their function, produce great amounts of heat that needs to be quickly dissipated from their surfaces (e.g., via air movement), in order to keep them and the engine operational. However, due to space constraints of some engine compartments, the pulley and damper(s) may need to be placed very close together, allowing limited room for air movement around the dampers and leading them to overheat.

U.S. Publication No. 2019/0383323 describes a heat dissipation structure for crankshaft dampers. A crankshaft damper includes an elastomeric member attached to a hub, an inertia ring connected to the hub through the elastomeric member, and structures for cooling the elastomeric member. The crankshaft damper may have openings, vanes, and recesses that cooperate to increase air flow through the openings.

The present disclosure is directed toward overcoming one or more of the problems discovered by the inventors.

SUMMARY OF THE INVENTION

In one embodiment, a damper and pulley assembly configured for use with an engine is disclosed. The damper and pulley assembly comprises: a cylindrical pulley having a first side and a second side opposite the first side and including a plurality of pulley air holes extending through the cylindrical pulley, a plurality of pulley attachment holes, and a plurality of first slots on the first side of the cylindrical pulley; a first cylindrical damper having a first side and a second side opposite the first side and including a plurality of first damper air holes extending through the first cylindrical damper and a plurality of first damper attachment holes; and a plurality of fasteners, each of the plurality of fasteners inserted into one of the plurality of pulley attachment holes and one of the plurality of first damper attachment holes, wherein the first cylindrical damper and the cylindrical pulley are aligned along a central axis, the first side of the first cylindrical damper faces the first side of the cylindrical pulley, and each of the plurality of pulley air holes is aligned to respective air holes of the plurality of first damper air holes.

In another embodiment, a damper and pulley system is disclosed. The damper and pulley system comprises: a first vibrational damper including first air holes positioned a first distance away from a central axis of the first vibrational damper, each of the first air holes positioned a second distance away from two adjacent first air holes; a second vibrational damper including second air holes positioned a third distance away from a central axis of the second vibrational damper, each of the second air holes positioned a fourth distance away from two adjacent second air holes; and a pulley, including first slots on a first side of the pulley, second slots on a second side of the pulley, and pulley air holes extending from the first slots to the second slots and positioned a fifth distance away from a central axis of the pulley, each of the pulley air holes positioned a sixth distance away from two adjacent pulley air holes, wherein the first distance is equal to the third distance and the fifth distance, and wherein the second distance is equal to the fourth distance and the sixth distance.

In another embodiment, an internal combustion engine is disclosed. The internal combustion engine comprises: a crankshaft; a first damper including first air openings extending from a first side of the first damper to a second side of the first damper; a second damper including second air openings extending from a first side of the second damper to a second side of the second damper; and a pulley including first slots in at least a first surface of the pulley and pulley air openings extending from the first slots through the pulley, wherein the first damper, the second damper, and the pulley are operatively connected to the crankshaft, and wherein each of the first air openings is aligned with respective second air openings and pulley air openings.

DETAILED DESCRIPTION OF THE INVENTION

The details of embodiments of the present disclosure, both as to their structure and operation, may be gleaned in part by study of the accompanying drawings, in which like reference numerals refer to like parts, and in which.

DETAILED DESCRIPTION OF THE INVENTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, wellknown structures and components are shown in simplified form for brevity of description.

For clarity and ease of explanation, some surfaces and details may be omitted in the present description and figures. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

Figure 1:
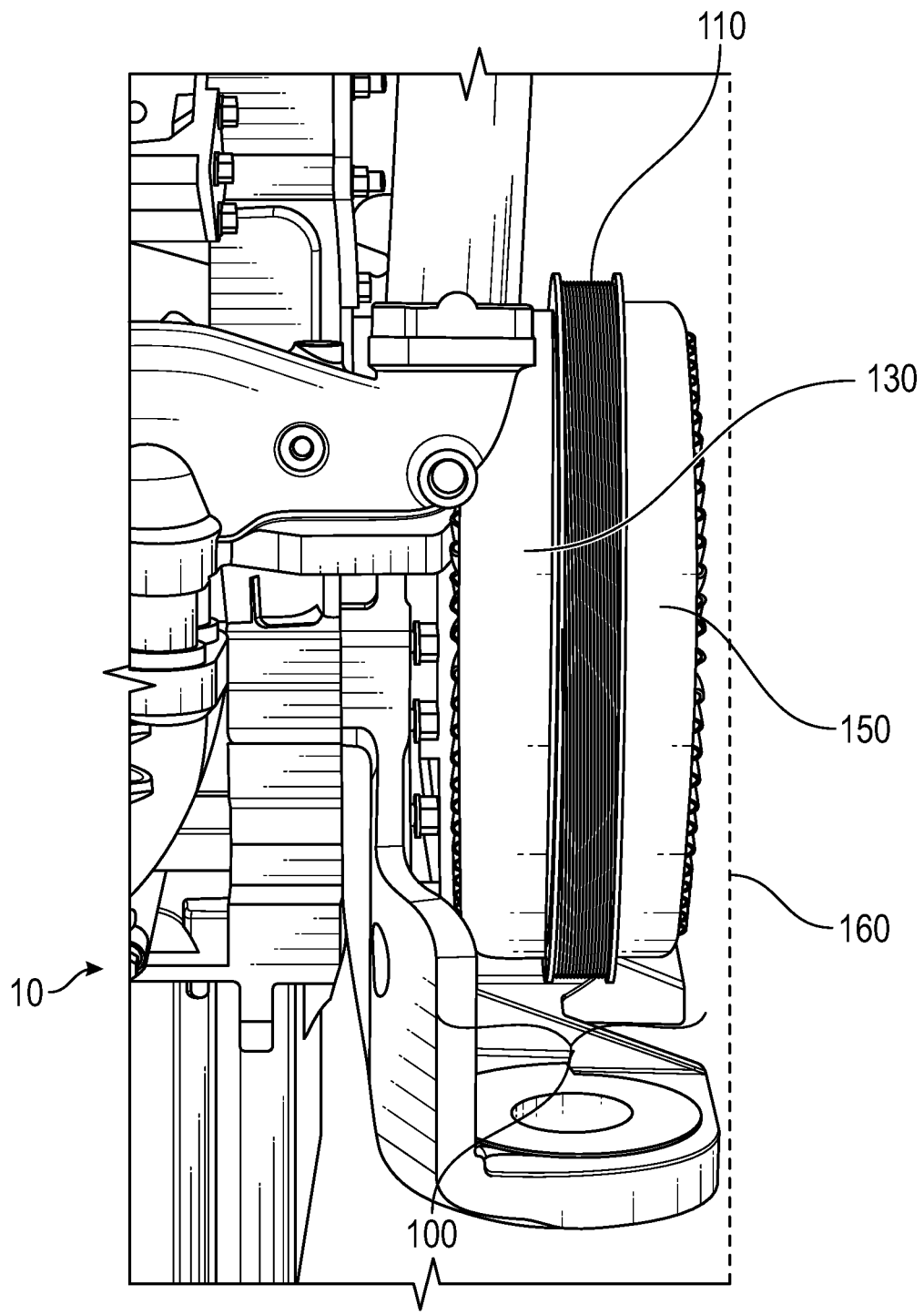
FIG. 1 shows a damper and pulley system in an engine compartment, according to an embodiment.

FIG. 1 shows an exemplary damper and pulley system or assembly 100 installed as a part of an internal combustion engine 10 (partially shown). The damper and pulley assembly 100 includes a pulley 110 sandwiched between a first damper 130 and a second damper 150. As will be apparent in descriptions of various figures further in the disclosure, a wider portion of the pulley 110 (outer ring configured to receive a belt) is positioned outside of the outer portions of one or both of the dampers. A belt (not shown) can be located on the pulley and connected to other parts of the engine. The damper-pulley assembly 100 may be connected to a front part of a crankshaft, either directly or via an adapter, and be configured to (i) via the dampers 130/150, counter vibrations from the crankshaft and (ii) via the pulley 110, drive the alternator and/or other engine accessories. The dashed line 160 indicates an engine compartment wall at the front of the engine.

The damper and pulley assembly 100 of FIG. 1 may be included in an engine of a vehicle. In one example, the damper and pulley assembly 100 may be part of an engine used in armored vehicles. However, the damper and pulley assembly 100 of the present disclosure may be implemented in other types of engines (e.g., 4-, 6-, 8-, 12-cylinder; gasoline, diesel, gas turbine, etc.) that may require vibration damper(s) and pulley(s) to be spaced close together. Similarly, an engine with the damper-pulley 100 design of the present disclosure may be used in various types of machinery, for example, mobile equipment associated with an industry (e.g., paving, mining, construction, transportation, energy exploration, farming, forestry, etc.); ordinary road vehicles (e.g., automobiles, racing cars, semi-trucks, etc.); aircraft, trains, maritime vessels; and/or military-use vehicles (e.g., tanks, armored personnel carriers, etc.).

Figure 2:
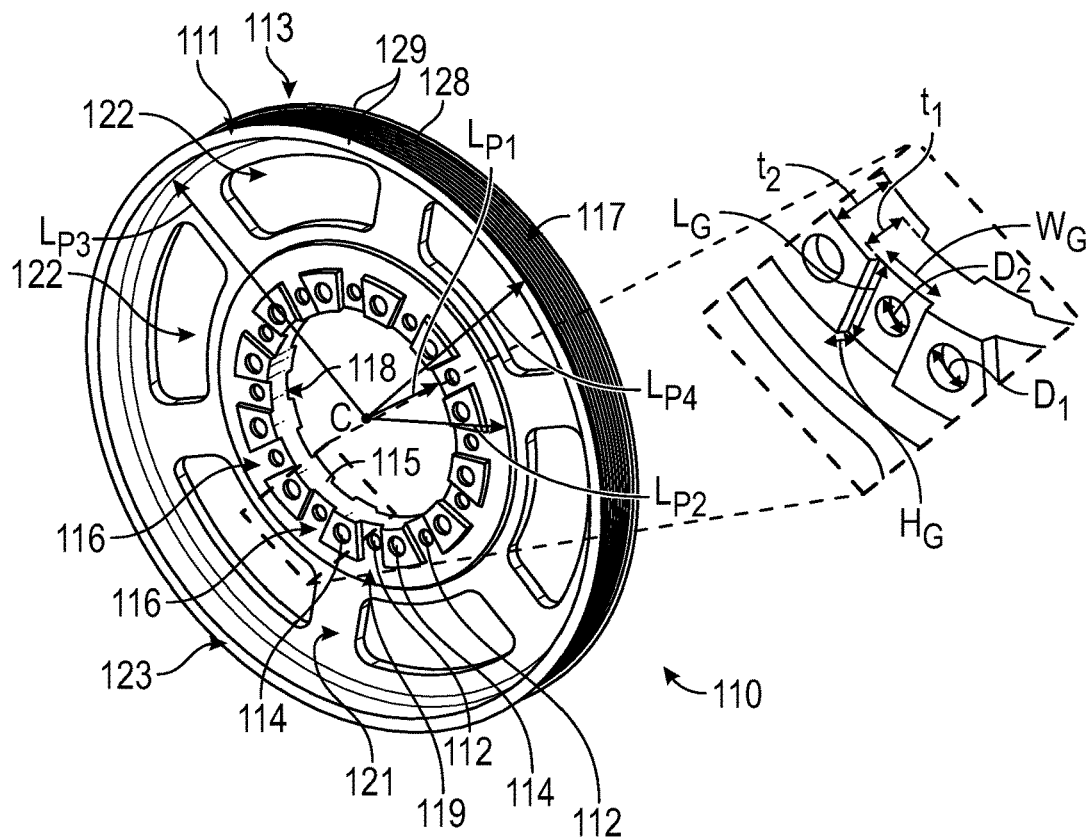
FIG. 2 shows a pulley which may be used in the system of FIG. 1 and a detailed view of a portion of the pulley, according to an exemplary embodiment.

FIG. 2 shows a pulley 110 which may be used in the damper-pulley assembly of FIG. 1, according to an exemplary embodiment. The pulley 110 is an annular or cylindrical pulley having a circular perimeter, which may be defined as having a central axis C, an inner or intermediate hub portion 119, a middle hub portion 121, and an outer ring portion 123. The perspective view of the pulley 110 in FIG. 2 primarily shows a first side 111 of the pulley, with the second, opposite side 113 hidden from view.

The inner hub portion 119 extends from an inner circumference/periphery 115 (a first distance $L_{P1}$ from the axis C) of the pulley 110 to a second distance $L_{P2}$ from the axis C. The middle hub portion 121 extends from the second distance $L_{P2}$ to the third distance $L_{P3}$ from the axis C. The outer ring 123 extends from the third distance $L_{P3}$ to an outer circumference/periphery 117 of the pulley 110 (at fourth distance $L_{P4}$ from the central axis C). In one embodiment of the disclosure, $L_{P1}$ is 78-80 mm, $L_{P2}$ is 123-125 mm, $L_{P3}$ is 208-210 mm, and $L_{P4}$ is 218-220 mm. In one example, $L_{P1}$ is 78.6 mm, $L_{P2}$ is 124 mm, $L_{P3}$ is 209.1 mm, and $L_{P4}$ is 219.3 mm. However, the various distances $L_{P1-P4}$ that define the parts of the pulley 110, as well as the thickness of each of the parts 119/121/123), may depend on a specific engine and/or damper design, and are not limited to these examples or the illustration of FIG. 2.

The outer periphery 117 on the outer ring 123 of the pulley 110 may include one or more grooves 128 and side guides or flanges 129 (one on each of the sides 111/113 of the pulley) for a belt (not shown). The outer ring portion 123 of the pulley 110 may be wider/thicker than the other portions of the pulley 110, as shown in FIG. 2. That is, the distance between the pulley first side 111 and the pulley second side 113 is greater on the ring portion 123 than on the other portions 119/121 of the pulley 110. In addition, the inner and middle portions 119/121 may not be centered with respect to the outer ring portion 123 along the direction of the central axis C. For example, the first side of the ring portion 123 may be flush with the first sides of the inner and middle hub portions 119/121, such that the first side 111 of the pulley is generally flat along all three areas 119/121/123 (and the outer ring 123 protrudes on the second side 113 of the pulley). Alternatively, the inner and mid hub portions 119/121 may be centered or slightly off-center with respect to the outer ring 123 (such that the outer ring 123 protrudes, equally or unequally, on both sides 111/113 of the pulley).

The middle hub portion 121 of the pulley 110 may include a plurality of annularly spaced apart, middle hub openings 122. In the example of FIG. 2, the pulley 110 has six middle hub openings 122, however, lesser or greater numbers of openings 122 may be used. These openings 122 may have rounded corners and generally follow the shape of the middle hub portion 121, as shown in FIG. 2, however, other types of opening shapes may be used.

As shown in FIG. 2, the inner hub portion 119 of the pulley includes a plurality of annularly spaced apart bolt/fastener or attachment holes/openings 114 and air or cooling holes/openings 112 between each adjacent pair of bolt holes. In other words, bolt holes 114 and air holes 112 alternate around the inner hub portion 119 of the pulley 110. Each of the bolt and air openings 114/112 extends through the pulley 110 from the first side 111 to the second side 113 of the pulley 110. The air openings 112 are each located in first and second side slots or grooves 116/118 formed on respective first and second surfaces 111/113 of the pulley 110. As such, the thickness $t_1$ (i.e., along a direction of the central axis C) of the inner portion 119 of the pulley 110 at the slots 116/118 (i.e., where the air holes 112 are located) is thinner than the thickness $t_2$ of the inner portion 119 of the pulley 110 between the slots (i.e., where the bolt holes 114 are located). These reduced thickness areas of the pulley 110 form air passage slots, as will be described in further detail below.

The example of FIG. 2 shows twelve bolt holes 114, twelve air holes 112, and twenty-four slots 116/118 (twelve on each side of the pulley) located on the inner hub portion 119 of the pulley 110. However, the disclosure is not limited to those particular numbers of holes/grooves. In one embodiment, the pulley may be pre-designed to match installation specifications of an engine/dampers (e.g., to have a specific number of bolt holes 114 at specific locations). The number of grooves 116/118 and air openings 112 may be chosen to accommodate the pre-designed installation specifications (e.g., to have the same number of air openings 112 as the required number of bolt holes). For example, if a specific engine and/or damper design requires that the pulley 110 have six bolt holes 114 for installation, the pulley 110 may have six air holes 112 placed between the bolt holes 114 and located in twelve slots 116/118 (six on each side 111/113 of the pulley). In addition, the number of air holes 112 does not need to equal the number of bolt holes 114. For example, air holes 112 (and corresponding slots 116/118) may be placed in every other (or every third, etc.) space between two adjacent bolt holes 114.

In an exemplary embodiment, a diameter $D_1$ of the bolt holes 114 is different from a diameter $D_2$ of the air holes 112 (e.g., bolt holes having 13.8 mm diameters and air holes having 11.5 mm diameters). This may ensure that the correct openings are used during pulley mounting/installation. In one example, the air holes 112 are a different shape (e.g., oblong, rectangular, etc.) than the bolt holes 114. In the example of FIG. 2, the air holes 112 are located a same distance from the center axis C of the pulley 110 as the bolt holes, if the distance is measured from the centers of both air and bolt holes. However, in alternate embodiments, the air holes 112 may be closer or farther away from the center axis C (such that, for example, the air holes 112 and bolt holes 114 form a zig-zag pattern).

The slots/grooves 116/118 are oriented along the radial direction of the pulley 110 (orthogonal to central axis C) and help promote air flow across the engine dampers, when the pulley 110 is installed in the damper-pulley system 100. The slots 116/118 have an axial depth $H_G$ (i.e., along a direction of the central axis C), a radial length $L_G$, and a circumferential or annular width $W_G$ (which may be constant if the slots are perfectly rectangular or, alternatively, gradually changing if the slots get wider as they move outwards away from the central axis C). Each slot is defined by two opposite walls extending in the radial direction and having dimensions $L_G$ by $H_G$. In one embodiment, the axial depth $H_G$ of the grooves 116/118 is 3-6 mm, for example, 4±0.5 mm or 5.0±0.5 mm. In one specific example, the height $H_G$ is 4.8 mm.

Finally, the pulley 110 has a central opening, defined by inner circumference 115, for installation onto the nose of a crankshaft adapter that is operatively connected to a crankshaft. In an alternate embodiment, the pulley may be directly connected to the nose of the crankshaft itself. The size of the inner circumference of the pulley may be predetermined by installation requirements of the specific engine (or crankshaft or crankshaft adapter of the engine) that the pulley is intended to be used on.

Figure 3:
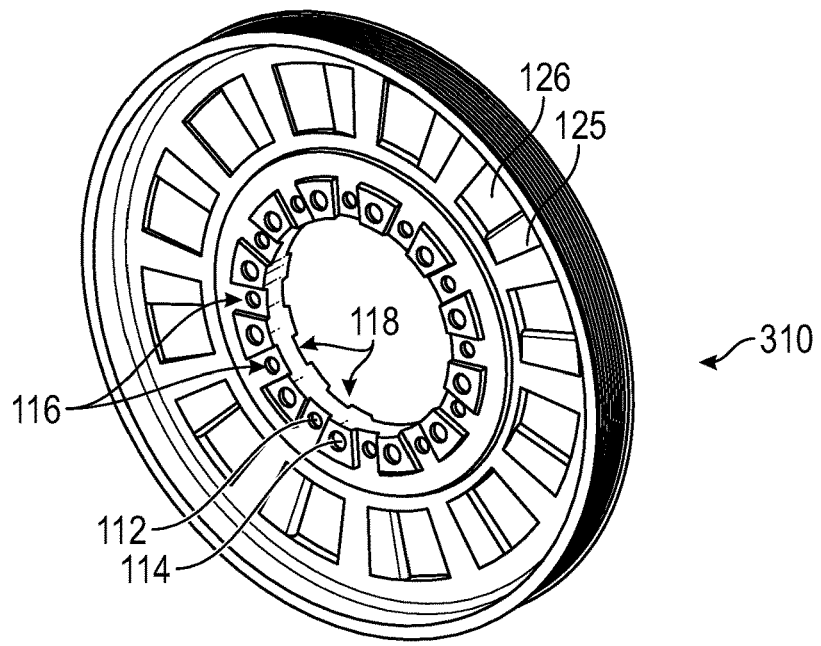
FIG. 3 shows a pulley which may be used in the system of FIG. 1, according to another embodiment.

In one embodiment, FIG. 3 shows the pulley 310. Various features of the pulley 310 in FIG. 3 may be generally the same as the features of the pulley 110 in FIG. 2, with the exception of the design of the middle hub openings. The pulley 310 of FIG. 3 may be used in the pulley-damper system 100 described in FIG. 1. In the embodiment of FIG. 3, the middle hub part 121 of the pulley 310 includes openings 126 with angled fan blades 125 that help draw air through the openings 126. In one embodiment, each fan blade 125 occupies a third of the area of its opening 126, however, in various other embodiments the fan blades 125 may be smaller or larger, depending, for example, on the specifications of the pulley design.

Figure 4:
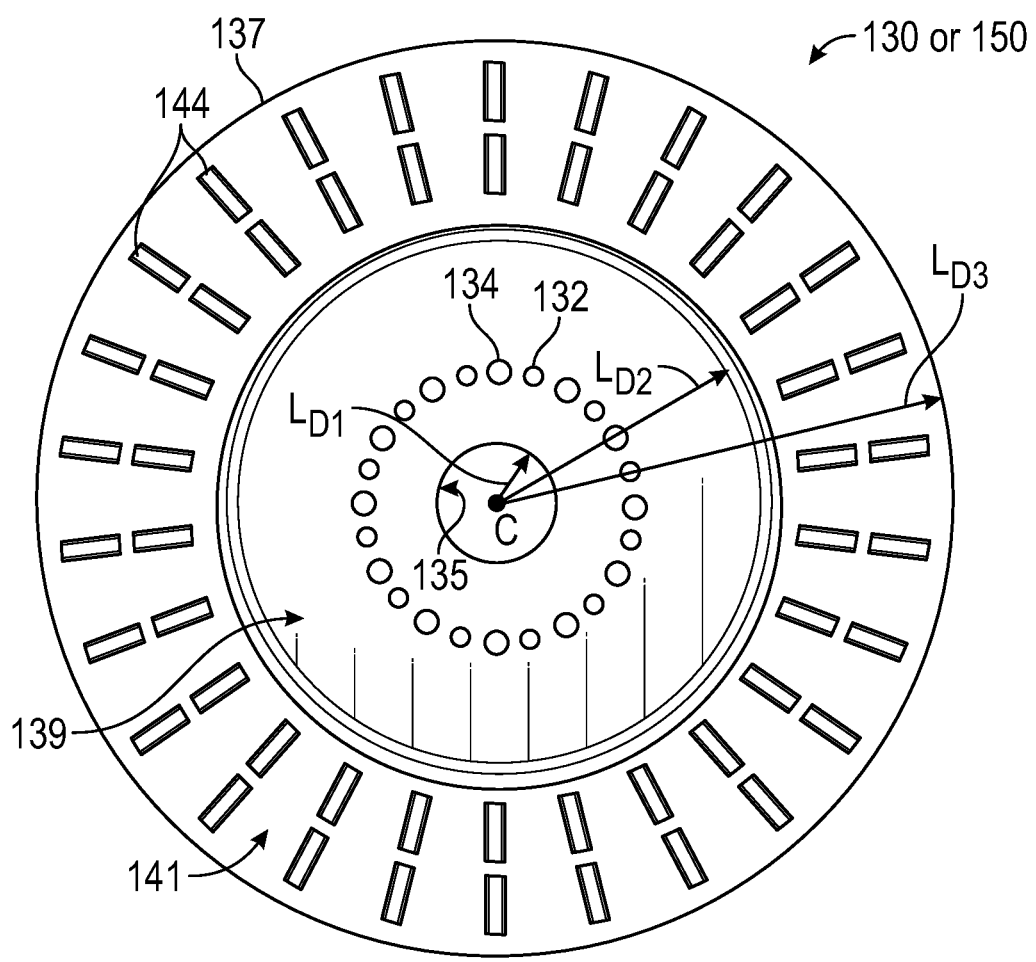
FIG. 4 shows a damper which may be used in the system of FIG. 1, according to an exemplary embodiment.

FIG. 4 shows a damper 130 or 150 which may be used in the damper-pulley assembly 100 of FIG. 1, according to an exemplary embodiment. The damper 130/150 is an annular or cylindrical damper having a circular perimeter.

Each damper 130/150 in the assembly 100 includes (i) an inner hub portion 139 extending from an inner damper periphery/circumference 135 (a first distance $L_{D1}$ from the axis C) to a second distance $L_{D2}$ from the axis and (ii) an outer ring portion 141 extending from the second distance $L_{D2}$ to an outer circumference/periphery 137 (a third distance $L_{D3}$ from the axis). Note that axis C in FIG. 4 extends in/out of the page and is illustrated as a point.

The inner hub portions 139 of the dampers 130/150 include bolt/fastener or attachment holes/openings 134 and air holes/openings 132 which align to the bolt openings 114 and air openings 112, respectively, of the pulley 110.

In an exemplary embodiment, both sides of each of the dampers 130/150 have a plurality of cooling elements or fins 144, which increase the heat-dissipating surface areas of the dampers 130/150. The cooling fins 144 in the exemplary embodiment are projections in the shape of half-cylinders, arranged in two rows on each side of the outer rings 141 of the dampers 130/150 (FIG. 4 only shows one of the two sides of the damper). A longitudinal axis of each cooling fin is oriented along the radial direction. However, other designs and configurations of cooling fins may be used (e.g., elongated/prolonged protrusions or simple orthogonal wall protrusions in any number of rows), as long as the cooling fins fit within the design of the damper-pulley assembly 100 and increase the heat-dissipating surface areas of the dampers 130/150. In other embodiments, the dampers 130/150 can have cooling elements/fins only on one side, or no specific cooling elements/fins at all. In such case, the heat dissipation in the dampers 130/150 will be provided by the flat surface areas of the dampers themselves.

Figure 5:
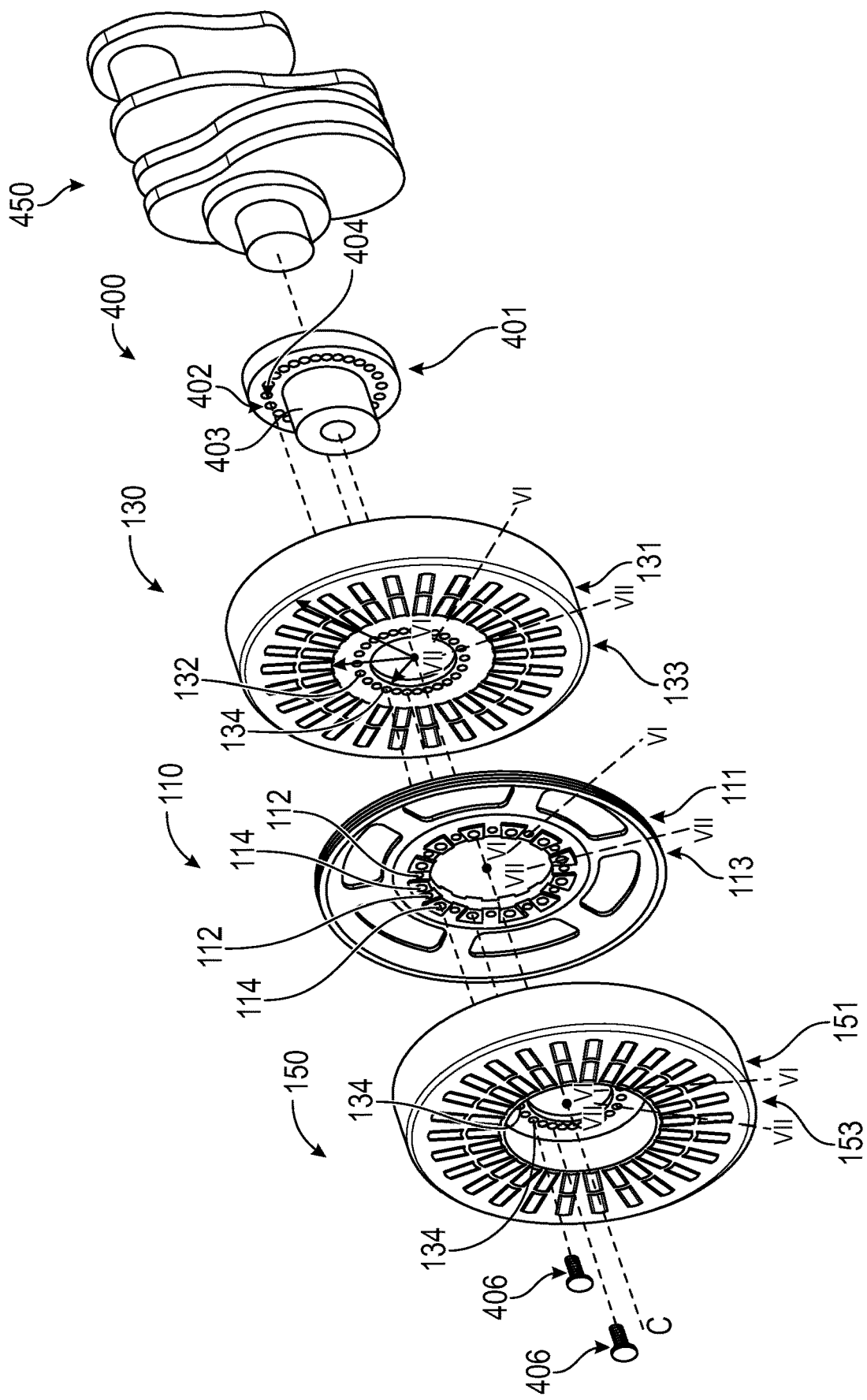
FIG. 5 shows an exploded view of the damper and pulley system of FIG. 1, according to an exemplary embodiment.

FIG. 5 shows an exploded view of the damper-pulley assembly 100 of FIG. 1 together with a crankshaft adapter 400 and a crankshaft 450 (shown partially in FIG. 5). The front side of the adapter 400 includes a nose portion 403 configured to fit inside the central openings of the dampers 130/150 and pulley 110. The connecting plate 401 of the adapter 400 mates onto the crankshaft of an engine (not illustrated) via additional attachment holes/features (not illustrated). The damper-pulley assembly 100 may include the pulley 110 (or 310) described above with respect to FIGS. 2 and 3 and dampers 130/150 described in FIG. 4. The damper-pulley assembly 100 includes the pulley 110 sandwiched between a first damper 130 and a second damper 150. Both dampers 130/150 are aligned with the pulley 110 along the central axis C. The first damper 130 has a first side 131 (facing the crankshaft) and a second side 133 (facing the first side 111 of the pulley 110). The second damper 150 has a first side 151 (facing the second side 113 of the pulley 110) and a second side 153 (facing the front wall of the engine compartment 160, show in FIG. 1). The outer hub portion 141 of each damper 130/150 is wider/thicker than the inner hub portion 139 (this may be seen, for example, in damper 150 of FIG. 5). In addition, the inner hub portion 139 of each damper 130/150 may not be centered along the central axis with respect to the outer ring portion 141. For example, the second side 133 of the first damper 130 may be flat, while the first side 131 of the first damper 130 includes the outer ring portion 141 protruding from the inner hub portion 139. Similarly, the first side 151 of the second damper 150 may be flat, while the second side 153 has a protruding outer ring portion 141.

In the damper-pulley assembly 100, the inner part of the outer ring portion 123 of the pulley 110 is slightly spaced apart (in the radial direction) from the outer peripheries 137 of the dampers 130/150. In other words, the third distance $L_{D3}$ of the dampers 130/150 is smaller than the third distance $L_{P3}$ of the pulley 110.

Note that since the outer ring portion 123 of the pulley 110 protrudes from the rest of the pulley 110 on one or both sides 111/113, when all components are assembled, a part of the damper (or both dampers) facing that side(s) of the pulley fits inside/under the protruding portion of the outer ring 123. The assembled system 100 includes a small distance between the outer perimeter 137 of the damper (130 and/or 150) and the portion of the outer ring 123 placed over it (due to the difference between third distance $L_{P3}$ of the pulley 110 and third distance $L_{D3}$ of the dampers), such that the outer ring 123 of the pulley 110 and slightly spaced apart from the damper (or dampers) 130/150 over which it extends.

When the dampers 130/150 and pulley 110 are assembled together and installed in the engine, bolts or fasteners 406 are inserted into respective (i) bolt holes 134 of the second damper 150, (ii) bolt holes 114 of the pulley 110, (iii) bolt holes 134 of the first damper 130, and (iv) bolt holes 404 of a connecting plate/flange 401 of the crankshaft adapter 400 (or the crankshaft itself 450), as shown in FIG. 5. Alternatively, instead of (or in addition to) the connecting plate 401, a central connecting bolt may be inserted into the center of the adapter nose 403 (or the nose of crankshaft 450) to hold the dampers 130/150 and pulley 110 to the engine. Although only two bolts 406 are illustrated in FIG. 5, it should be apparent that twelve bolts 406 would be used in the assembly and installation of the damper-pulley system 100 to match the twelve bolt holes in each of the dampers 130/150, pulley 110, and adapter plate 401. Further, as discussed above with respect to FIG. 2, the disclosure is not limited to the particular number of bolt holes, as long as the pulley 110, two dampers 130, and connecting plate 401 have matching numbers and locations of respective bolt holes 114/134/404.

A rod/nose portion 403 of the crankshaft adapter 400 fits through the central openings of the dampers 130/150 and the pulley 110 during installation. In an exemplary embodiment, the inner peripheries 135 of the dampers 130/150 generally line up with the inner periphery 115 of the pulley 110 and can be fitted around the circumference of the nose 403.

When the pulley and dampeners are assembled, the air openings 132 on the inner hub portions 139 of both dampers 130/150 line up to the air openings 112 of the pulley 110. Additionally, if the connecting plate 401 is present, the air openings 112/132 also line up to air openings 402 in the connecting plate 401. The size and shape of the damper air holes 132 may generally also correspond to the size and shape of the pulley air holes 112 (and, if applicable, to the adapter plate air holes 402).

The damper-pulley assembly 100 shown in FIGS. 1 and 5 includes a pulley 110 sandwiched between two dampers 130/150, however, the advantages of the present disclosure would also work for a pulley assembled with a single damper (for example, either the first damper 130 or the second damper 150 in the assembly of FIGS. 1 and 4). In such an embodiment, the other side of the pulley 110 (that is, the side not contacting the single damper) may be mostly flat. In other words, the other side of the pulley could have no grooves 116/118 and the outer ring of the pulley 123 would not protrude on that side.

INDUSTRIAL APPLICABILITY

Figure 6:
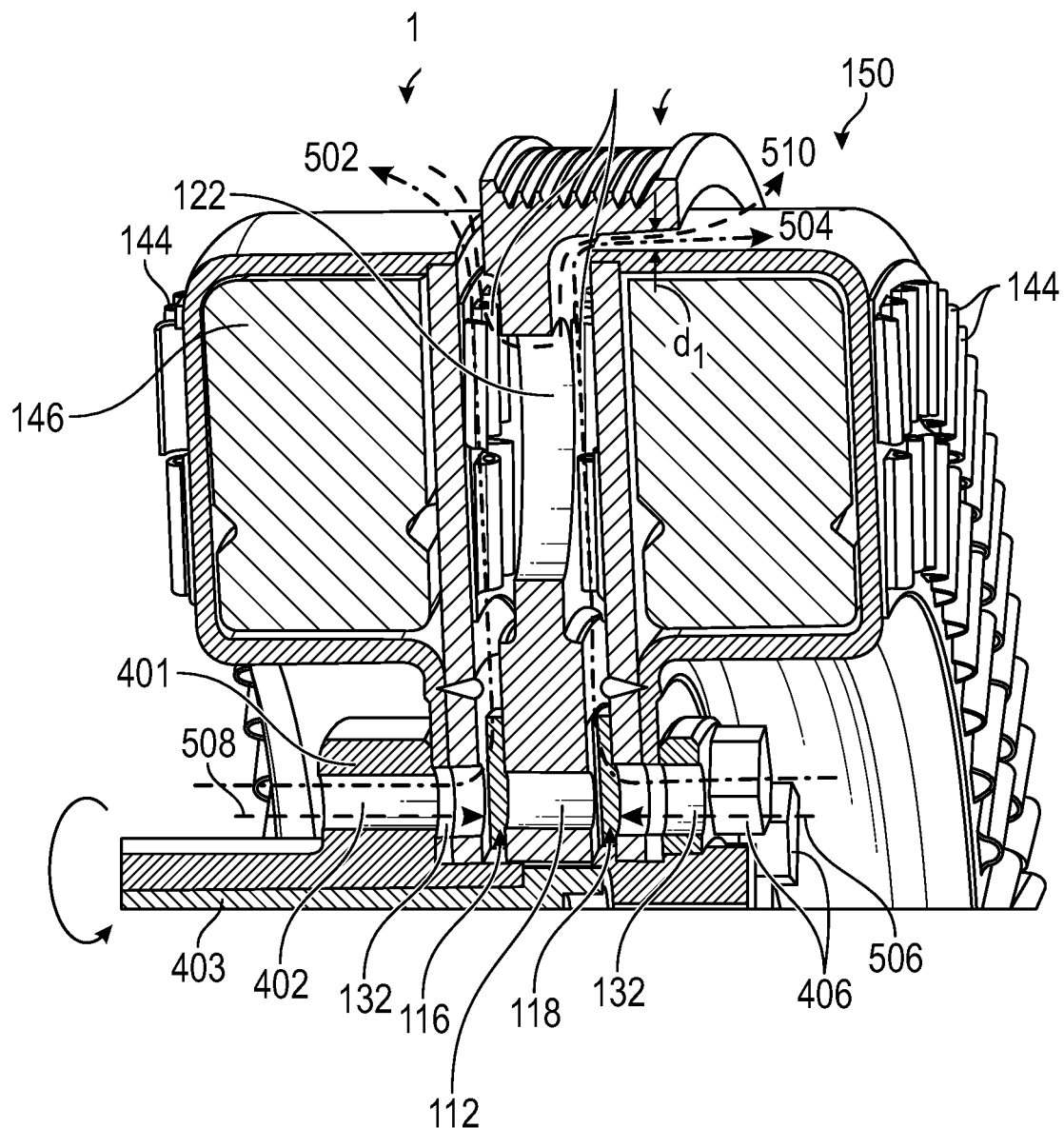
FIG. 6 shows a close-up, cut away view of upper portion of the damper and pulley system of FIGS. 1 and 5, cut along cross section VI-VI shown in FIG. 5, according to an exemplary embodiment.
Figure 7:
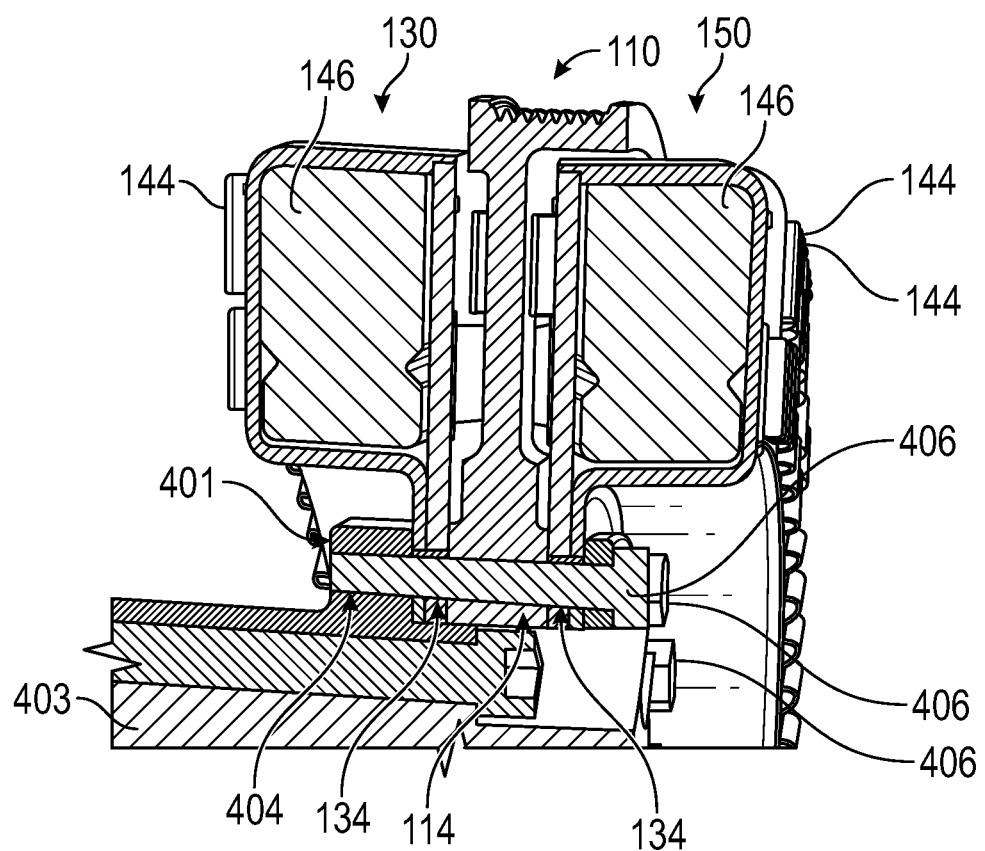
FIG. 7 shows a close-up, cut away view of the damper and pulley system of FIGS. 1 and 5, cut along cross section VII-VII shown in FIG. 5, according to an exemplary embodiment.

FIGS. 6 and 7 show different cross-section views of a portion of the damper-pulley assembly 100 described above with respect to FIGS. 1-5. Both figures also illustrate a ring of material 146 (inertia ring/weight) located inside the casing of the outer ring portion 141 of each of the dampers 130/150 and surrounded by thin layers of viscous fluid (not shown). During operation of the engine, the inertia rings 146 freely rotate inside their outer ring 141 casings (helping transform vibrations of the crankshaft into heat, which then needs to be dissipated). In another embodiment, the outer portions 141 of the dampers 130/150 are a single solid material. In other embodiments, various other damper designs may be used, as long as the bolt holes 134 and air holes 132 are positioned to align with the bolt holes 114 and air holes 112 of the pulley, as previously discussed. For example, in addition to or instead of inertia rings, the dampers 130/150 can include one or a combination of: solid rubber parts, spring elements, foam or foam-like elements, etc.

FIG. 6 shows a closeup cross-sectional view of the damper-pulley assembly 100 of FIGS. 1 and 5, cut along a line VI-VI (shown in FIG. 5) that includes the air holes 112, 132, and 142 of the pulley 110, dampers 130/150, and crankshaft adapter 400 respectively. During operation of the engine, as shown in FIG. 6, the damper-pulley system 100 is rotated by the crankshaft. While various components (e.g., pulley 110 and dampers 130/150) of the damper-pulley system 100 are spinning, air pressure around the inner hub portions 139/119 of the dampers 130/150 and pulley 110 is naturally higher than air pressure around the outer portions of the components, since air at the outer damper-pulley portions would have the greater speed (and per Bernoulli's principle, an increase in the speed of a fluid produces a decrease in pressure). The pressure differential facilitates the flow of air radially outwards along the surfaces of the dampers 130/150 (and the pulley 110). In FIG. 6, the arrows 502-510 show air movement through and around the assembly 100.

The slots 116/118 on both sides of the pulley 110 provide passages for the displaced air along both sides 111/113 of the pulley and the inner surfaces 133/151 of the dampers 130/150 (the surfaces labeled in FIG. 5). The air openings 112 in the pulley 110, the air openings 132 in the dampers 130/150, and the air openings 402 of the crankshaft adapter plate 401 are (i) aligned with each other, such that air is allowed to flow from either side of the assembly to the slots 116/118 of the pulley (shown by movement arrows 506/508) and (ii) lead directly to the grooves 116/118, such that air is allowed move from outer surfaces 131/153 of the dampers 130/150, through the damper openings 132 and, via the grooves 116/118, out radially along the inner surfaces 111/113 of the dampers 130/150 (as indicated by arrows 502/504). As air moves through and around the cooling fins 144 (located on both sides of each damper 130/150), the fins 144 help dissipate heat from the dampers 130/150. In addition, the shape/orientation of the cooling fins (e.g., lined up along the radial direction and providing minimal resistance to air moving radially along the surfaces of the dampers) ease the air movement 502/504 along the surfaces of the dampers. The middle hub openings 122 (or 126) of the pulley 110 further facilitate movement of air around the cooling fins 136 (as shown by arrow 510).

As shown in FIG. 6, the spacing between the pulley 110 and the two dampers 130/150 may be quite tight (and may be defined by the height $H_G$ of the slots 116/118 which may be, for example, 3-6 mm), so that increased air flow may be necessary to achieve sufficient heat dissipation. The outer ring 123 of the pulley 110 may sit over the outer ring portion 141 of the second damper 150. As described elsewhere in the disclosure, the outer ring 123 may be slightly spaced away (e.g., by a distance di) from the outer periphery 137 of the damper 150, to allow for air to flow outward (arrow 504). In another embodiment, the outer ring 123 of the pulley may sit over the first damper 130. In yet another alternate embodiment, the outer ring 123 of the pulley 110 may be completely or partially centered, such that one side of the outer ring 123 is positioned over the first damper 130 and the other side of the outer ring 123 is positioned over the second damper 150.

FIG. 7 shows a closeup cross-sectional view of the damper-pulley assembly 100 of FIGS. 1 and 5, cut along a line VII-VII (shown in FIG. 5) that includes one of the assembly bolts 406 and does not include any of the air holes. The bolts 406 are installed through bolt holes 134 (in the dampers 130/150), 114 (in the pulley 110), and 404 (in the connecting plate 401 of the crankshaft adapter). FIG. 7 does not show any air movement and is included in the disclosure primarily to demonstrate the advantages of the cooling features (e.g., air holes and slots) shown in FIG. 6.

As previously discussed, the damper-pulley assembly 100 of the present disclosure is not limited to a particular number, shape, or location of air openings and grooves (in the pulley). The number, shape, and location of the air openings and grooves may, for example, depend on the installation requirements and specifications of a particular engine. However, when assembled, the air openings 132 of the dampers 130/150 should line up with the grooves 116/118 and air openings 112 of the pulley 110, as discussed above with respect to FIGS. 5 and 6.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of engine or machine. Hence, although the present embodiments are, for convenience of explanation, depicted and described as being implemented in a specific engine it will be appreciated that it can be implemented in various other types of engines and machines. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A damper and pulley assembly configured for use with an engine, the damper and pulley assembly comprising:
    a cylindrical pulley having a first side and a second side opposite the first side and including a plurality of pulley air holes extending through the cylindrical pulley, a plurality of pulley attachment holes, and a plurality of first slots on the first side of the cylindrical pulley;
    a first cylindrical damper having a first side and a second side opposite the first side and including a plurality of first damper air holes extending through the first cylindrical damper and a plurality of first damper attachment holes; and
    a plurality of fasteners, each of the plurality of fasteners inserted into one of the plurality of pulley attachment holes and one of the plurality of first damper attachment holes,
    wherein the first cylindrical damper and the cylindrical pulley are aligned along a central axis, the first side of the first cylindrical damper faces the first side of the cylindrical pulley, and each of the plurality of pulley air holes is aligned to respective air holes of the plurality of first damper air holes.

2. The damper and pulley assembly of claim 1, wherein the first damper further comprises an inner hub portion, including the plurality of first damper air holes, and an outer portion comprising an inertia ring; and wherein the cylindrical pulley further comprises an inner hub portion, including the plurality of pulley air holes, and an outer peripheral surface having a belt groove formed therein.

3. The damper and pulley assembly of claim 1, wherein each of the plurality of first slots includes first sidewalls and second opposing sidewalls and are open along third and opposite fourth sides, and wherein the first and second sidewalls extend radially from the central axis.

4. The damper and pulley assembly of claim 1, wherein each of the plurality of pulley air holes is disposed inside a respective first slot of the plurality of first slots.

5. The damper and pulley assembly of claim 4, wherein each of the plurality of first damper air holes is aligned to a respective first slot of the plurality of first slots.

6. The damper and pulley assembly of claim 1, wherein the first damper further includes first cooling fins on both the first side and the second side of the first damper.

7. The damper and pulley assembly of claim 6, wherein each of the first cooling fins has a prolonged shape and wherein the prolonged shape of each of the first cooling fins is oriented along a radial direction of the first damper.

8. The damper and pulley assembly of claim 6, wherein the first slots are configured to direct a flow of air out radially along the first side of the first cylindrical damper and toward at least some of the first cooling fins.

9. The damper and pulley assembly of claim 1, wherein each of the plurality of pulley air holes is identical in size to one another, each of the plurality of pulley attachment holes is identical in size to one another, and a diameter of the pulley air holes is different from a diameter of the attachment holes.

10. The damper and pulley assembly of claim 9, wherein the diameter of the pulley air holes is smaller than the diameter of the attachment holes.

11. The damper and pulley assembly of claim 1, wherein an outer portion of the cylindrical pulley is positioned over an outer perimeter of the first damper.

12. The damper and pulley assembly of claim 11, wherein the outer portion of the cylindrical pulley is spaced apart from the outer perimeter of the first damper.

13. The damper and pulley assembly of claim 1, further comprising:
    a second cylindrical damper having a first side and a second side and including a plurality of second damper air holes and a plurality of second damper attachment holes,
    wherein the cylindrical pulley is sandwiched between the first cylindrical damper and the second cylindrical damper, such that the first side of the second cylindrical damper faces the second side of the cylindrical pulley; the cylindrical pulley further includes a plurality of second slots on the second side of the cylindrical pulley; the second cylindrical damper is aligned along the central axis; and each of the plurality of pulley air holes is further aligned to respective air holes of the plurality of second damper air holes.

14. The damper and pulley assembly of claim 13, wherein the cylindrical pulley further includes a plurality of second slots on the second side of the cylindrical pulley.

15. The damper and pulley assembly of claim 14, wherein each of the plurality of pulley air holes extends from a first slot to a second slot.

16. A damper and pulley system comprising:
a first vibrational damper including first air holes positioned a first distance away from a central axis of the first vibrational damper, each of the first air holes positioned a second distance away from two adjacent first air holes,
a second vibrational damper including second air holes positioned a third distance away from a central axis of the second vibrational damper, each of the second air holes positioned a fourth distance away from two adjacent second air holes; and
a pulley, including first slots on a first side of the pulley, second slots on a second side of the pulley, and pulley air holes extending from the first slots to the second slots and positioned a fifth distance away from a central axis of the pulley, each of the pulley air holes positioned a sixth distance away from two adjacent pulley air holes,
wherein the first distance is equal to the third distance and the fifth distance, and wherein the second distance is equal to the fourth distance and the sixth distance.

17. The damper and pulley system of claim 16, wherein the first air holes, the second air holes, and the pulley air holes have the same diameter.

18. An internal combustion engine comprising:
a crankshaft;
a first damper including first air openings extending from a first side of the first damper to a second side of the first damper;
a second damper including second air openings extending from a first side of the second damper to a second side of the second damper, and
a pulley including first slots in at least a first surface of the pulley and pulley air openings extending from the first slots through the pulley,
wherein the first damper, the second damper, and the pulley are operatively connected to the crankshaft, and wherein each of the first air openings is aligned with respective second air openings and pulley air openings.

19. The internal combustion engine of claim 18, wherein a diameter of the first air openings is equal to a diameter of the second air openings and a diameter of the pulley air openings.

20. The internal combustion engine of claim 18, wherein the first slots have a first slot height and wherein the first air openings are spaced apart from respective pulley air openings by the first slot height.

\* \* \* \* \*